June 30, 1970     J. S. TRAVIA ET AL     3,518,541
DIGITAL PHASE MEASURING SET
Filed Aug. 9, 1968
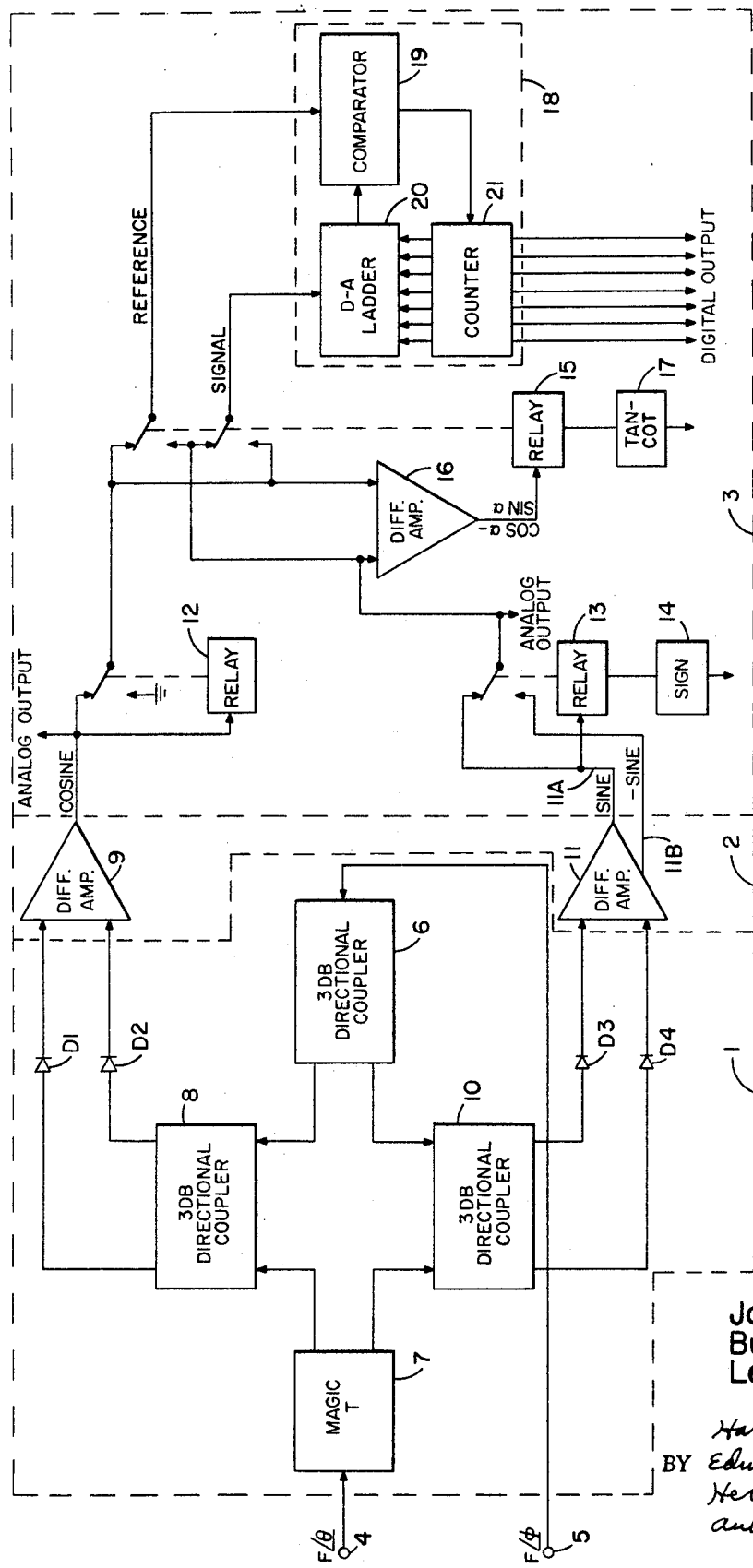
John S. Travia
Burton E. Salkins, Jr.
Leonard S. Rubin,
INVENTORS.
BY Harry M. Saragovitz
Edward J. Kelly
Herbert Berl
Aubrey J. Dunn United States Patent Office 3,518,541
Patented June 30, 1970

3,518,541
DIGITAL PHASE MEASURING SET
John S. Travia, Watertown, Burton E. Salkins, Jr., Chelmsford, and Leonard S. Rubin, Framingham, Mass., assignors, by mesne assignments, to the United States of America as represented by the Secretary of the Army
Filed Aug. 9, 1968, Ser. No. 751,548
Int. Cl. G01r 25/02
U.S. Cl. 324—84      2 Claims

ABSTRACT OF THE DISCLOSURE

A system wherein two signals, of the same frequency, but phase-shifted with respect to each other, are applied to a phase bridge. The phase bridge consists of an arrangement of 3 db directional couplers, diodes, and a magic-T. The diodes provide detected outputs, which outputs are fed into differential amplifiers. The differential amplifiers provide three outputs, one proportional to the sine of the phase shift, another proportional to the negative of the sine of the phase shift, and the third proportional to the cosine of the phase shift. One of the amplifier outputs, after processing in accordance with its sign, is applied to the reference input of an analog-to-digtal converter, and another output, after similar processing, is applied to the converter signal input. The converter provides a digital output representative of phase-shift.

BACKGROUND OF THE INVENTION

This invention is in the field of phase-measuring systems. Such systems are well known in the electronics art, and take various forms. One form (U.S. Pat. No. 3,096,-480, for example) is a circuit that measures the time between zero-crossings of a reference signal and a phase-shifted signal. This time is shown as an analog deflection of a meter pointer. Another form is that disclosed in U.S. patent application Ser. No. 650,167, filed June 28, 1967 by Donald E. Maxwell and Douglas R. Houst, and having a common assignee with the present invention. The Maxwell and Houst application is similar in some aspects to the above mentioned patent, but provides a digital output, by using the outputs of zero-crossing detectors to start and stop a counter. The present invention also starts and stops a counter for a digital output, but using a different circuit from the Maxwell and Houst disclosure. It should be noted that while the above identified patent device has an analog output, and the above identified application device has a digital output, neither can provide both type output.

SUMMARY OF THE INVENTION

A phase-measuring system wherein first and second phase-displaced signals are applied to a phase bridge, the outputs of the phase bridge being applied to an analog-to-digital converter through differential amplifiers and sign sensing circuits. The phase bridge consists of three 3 db directional couplers, a magic-T, and four diodes. The first signal is applied as an input to the magic-T. The two outputs of the magic-T have in-phase outputs, which outputs are applied to respective inputs of two of the couplers. The second signal is applied to an input of the third coupler, with the outputs of the third coupler connected to other inputs of the other two couplers. These other two couplers each have two ouputs, with the outputs connected to individual ones of said diodes. The diodes connected to the outputs of each of the said two couplers are also connected to inputs of respective differential amplifiers. The outputs of the amplifiers, after being processed for sign, control an analog-to-digital converter, which converter includes a counter. The amplifiers also provide an analog output dependent on the phase angle between the signals.

BRIEF DESCRIPTION OF THE DRAWING

The single drawing figure is a schematic diagram of the inventive system.

DESCRIPTION OF THE PREFERRED EMBODIMENT

Referring to the drawing figure, the inventive system consists of three major components, namely: a phase bridge (1), differential amplifiers (2), and a signal processor unit (3), with the components in respective numbered dotted-line rectangles. The two signals between which it is desired to measure the phase shall be herein designated $$f\underline{/\theta} \text{ and } f\underline{/\phi}$$

and are applied to input terminals 4 and 5, respectively. The signal $$f\underline{/\phi}$$

from terminal 5 is applied to a first 3 db directional coupler (6), which coupler has outputs $$f\underline{/\phi} \text{ and } f\underline{/\phi+90°}$$

The $$f\underline{/\theta}$$

signal from terminal 4 is applied to magic-T 7, with the T providing two $$f\underline{/\theta}$$

outputs. The $$f\underline{/\phi}$$

output from 6 and one of the $$f\underline{/\theta}$$

outputs from 7 are applied to a second 3 db directional coupler (8). Coupler 8 has two outputs, with the outputs being the vector sum of the inputs, but with one output 90° phase-shifted from the other. These outputs are applied through diodes D1 and D2 (which act as detectors) to a first differential amplifier (9). The output of 9 is taken as the cosine of the phase angle ($\alpha$) between $$f\underline{/\theta} \text{ and } f\underline{/\phi}$$

and may also be used as an analog output for the system. The $$f\underline{/\phi+90°}$$

output from 6 and the other $$f\underline{/\theta}$$

output of 7 are applied to a third 3 db directional coupler (10). Coupler 10 has two outputs, with the outputs being the vector sum of the inputs, but with one output 90° phase-shifted from the other. These outputs are applied through diodes D3 and D4 to a second differential amplifier (11). Output 11a is 90° phase-shifted from the output of 9, and is taken as the sine of the phase angle ($\alpha$) between $$f\underline{/\theta} \text{ and } f\underline{/\phi}$$

Output 11b is the negative of 11a.

The output of 9 and output 11a of 11 are applied to respective polar relays (or the equivalent) 12 and 13 in processor 3. These relays are responsive to the sign of the signals applied thereto, and their contacts remain in the position shown for positive signals. With a negative signal applied to 12, its movable contact becomes grounded. When a negative signal is applied to 13, its movable contact connects to line 11b, and the —sine signal from 11 is passed. An analog output is also provided at the movable contact of relay 13. Relay 13 also provides an output through sign detector 14. When relay 13 changes from the shown position to its alternate position, the output of 14 changes. Detector 14 may be merely additional contacts of 13, or some means to detect current flow in 13.

The signals from the movable contacts of relays 12 and 13 are applied to fixed contacts of another polar relay (15), and to inputs of differential amplifier 16. The output of 16 is proportional to cosine α—sine α. Relay 15 responds to the sign of the output from 16, and operates its movable contacts to the alternate position from that shown, if the output of 16 is negative. A tangent-cotangent detector 17 is connected to relay 15 and operates similar to sign detector 14. If relay 15 changes to its alternate position, the output of 17 changes, to indicate that either the tangent or the cotangent of the phase shift is being given.

Signal processor 3 also includes an analog-to-digital converter (18) with its reference input connected to the upper movable contact of relay 15, and its signal input connected to the lower movable contact of 15. With the output of 16 positive, the converter reference input is connected to the cosine output, and the signal input is connected to the sine output. The converter includes a comparator 19, a D-A ladder 20, and a counter 21. The arrangement of relays 12, 13, and 15 and differential amplifier 16 is such that the larger one of the sine and cosine outputs is applied to the reference input of converter 18. Counter 21 counts until its converted output is equal to the reference signal. The number in the counter at this time is the digital output of the system.

While a specific embodiment of the invention has been disclosed, the invention should be limited in scope only by the claims.

What is claimed is:
1. A system for measuring the phase between two signals comprising:
   a phase bridge having inputs and outputs;
   differential amplifiers having inputs connected to respective outputs of said phase bridge, and having outputs;
   signal processor means having inputs connected to said outputs of said amplifiers and having a digital output;
   wherein said phase bridge comprises:
      a magic-T having an input and first and second outputs;
      a first 3 db directional coupler having an input and first and second outputs;
      third and fourth 3 db directional couplers each having inputs and outputs;
   one of said signals connected to said input of said magic-T, the other of said signals connected to the input of said first coupler, said first output of each of said magic-T and said first coupler connected to respective inputs of said second coupler, said second output of each of said magic-T and first coupler connected to respective inputs of said third coupler;
   first plural diodes connected to respective ones of the outputs of said phase bridge;
   second plural diodes connected to second respective ones of the outputs of said phase bridge;
      wherein said amplifiers comprise:
         a first amplifier with its inputs connected to said outputs of said phase bridge; and a second amplifier with its inputs connected to said second outputs of said phase bridge;
      wherein said second amplifier has outputs of opposite polarity and said first amplifier has a single output;
      wherein said signal processing means includes:
         signal sensing means and
         analog-to-digital converter means connected to said signal sensing means; and
      wherein said signal sensing means includes:
         first polarity sensing means connected to the output of said amplifier and including means to connect the output of said amplifier to a first conductor;
         second polarity sensing means connected to the outputs of said second amplifier and including means to selectively connect the outputs of said amplifier to a second conductor;
         a third differential amplifier having respective inputs connected to said first and second conductors and having an output; and,
         third polarity sensing means connected to the outputs of said third amplifier and including means to selectively connect said first and second conductors to third and fourth conductors, said third and fourth conductors connected to respective inputs of said converter means.

2. The system of claim 1 wherein said converter includes:
   a comparator having first and second inputs and an output, with said first input connected to said third conductor;
   a digital counter having a control input and having outputs, with said control input connected to the output of said comparator; and
   a digital-to-analog converter having inputs connected to said outputs of said counter, another input connected to said forth conductor, and an output connected to said second input of said comparator.

References Cited

UNITED STATES PATENTS

| | | |
|---|---|---|
| 3,271,675 | 9/1966 | Kreinberg. |
| 3,395,346 | 7/1968 | Kincheloe _____ 324—84 XR |
| 3,399,345 | 8/1968 | Cohn _____ 324—84 |

ALFRED E. SMITH, Primary Examiner